June 23, 1964     G. THEOCLITUS     3,138,198
ROTARY REGENERATIVE HEAT EXCHANGE APPARATUS
Filed March 22, 1961

INVENTOR.
Gregory Theoclitus
BY
Wayne Lang
AGENT

United States Patent Office 3,138,198
Patented June 23, 1964

3,138,198
ROTARY REGENERATIVE HEAT EXCHANGE APPARATUS
Gregory Theoclitus, Wellsville, N.Y., assignor, by mesne assignments, to Combustion Engineering, Inc., a stock corporation of Delaware
Filed Mar. 22, 1961, Ser. No. 97,519
11 Claims. (Cl. 165—7)

The present invention relates to regenerative heat exchange apparatus, and particularly it relates to apparatus of the rotary type that includes a rotor having a mass of heat absorbent material that is carried alternately between a heating fluid and a fluid to be heated in order that heat from the first named fluid may be transferred to the latter.

Most rotary regenerative heat exchange apparatus in use today are of the well known Ljungstrom type in which the mass of heat absorbent element is continuously moved normal to spaced fluid streams in order that heat from one fluid may be transferred to the other through the intermediary of the heat absorbent mass. Optimum performance of apparatus of this type requires that the heat absorbent mass remain in contact with either fluid for a very limited period whereby there is but little variation in the temperature of the mass. Such conditions usually necessitate rotational speeds in the range of from one to ten r.p.m., while even higher rotational velocities have been used in connection with certain applications.

A structural feature common to most such apparatus is that compartments of the heat absorbent element are spatially separated by imperforate diaphragms that preclude excessive intermixing of the heating fluid and the fluid to be heated as the element is passed between ducts for the different fluids. This requirement has substantially precluded the development of rotary regenerative heat exchange apparatus of the type where the heat absorbent mass is alternately disposed in ducts for a heating fluid and a fluid to be heated while the mass is continuously moved in direct opposition or counter to the direction of fluid flow. By this arrangement that portion of the heat absorbent mass which has attained its highest temperature level because of extended contact with the heating fluid is moved into contact with a portion of the fluid to be heated which has already been preheated by contact with the heat absorbent mass at its lower temperature levels.

This counterflow regenerative principle provides for a high rate of heat transmission at a rotor speed that is substantially lower than that of the usual Ljungstrom type regenerative heat exchanger in which the fluids flow normal to the movement of the element mass.

Apparatus arranged in accordance with this principle provides a structure having a low degree of "entrained leakage" or carry-over of fluid from one fluid stream to the other in the compartments of heat absorbent material. Moreover, relatively moving surfaces are subject to less wear and it is possible to maintain an efficient fluid seal therebetween. An additional advantage of this type apparatus is that its requirement for rotational power is comparatively low and it is possible to effect substantial savings in the design of the rotor driving means.

Apparatus of this type is defined generally in the U.S. Patent No. 1,697,591 of W. E. Dowd. However, in spite of its advantages as above outlined, serious disadvantages inherent in the Dowd apparatus have retarded its development and it has never attained the wide usage common to the better known rotary type heat exchanger of the Ljungstrom type.

A serious disadvantage of the Dowd type rotary regenerative heat exchanger relates to the difficulty of precluding the leakage of fluid between passageways in which the pressure of the fluids is maintained at substantially different levels.

A further disadvantage of this type apparatus is the difficulty of incorporating into said apparatus a suitable high intensity heat absorbent surface. Still another disadvantage relates to the basic design of the Dowd apparatus which includes numerous movable parts, each of which is subject to serious wear and early failure.

The chief object of the present invention therefore is to provide a rotary regenerative heat exchange apparatus having a heat absorbent mass that is moved counter to the flow of the heating fluid and the fluid to be heated.

Another object of this invention is to provide a rotary regenerative heat exchanger of the counterflow type that is mechanically adapted for use with a high intensity heat exchange surface.

A further object of this invention is to provide apparatus of the type defined that has a low rate of entrained leakage suitably adapted for an efficient sealing arrangement.

A still further object of this invention is to provide a counterflow arrangement to heat exchange apparatus that retains most other characteristics of more conventional cross flow type apparatus.

These and other objects of my invention will become more apparent when viewed in conjunction with the following detailed description and drawings in which.

Figure 1:
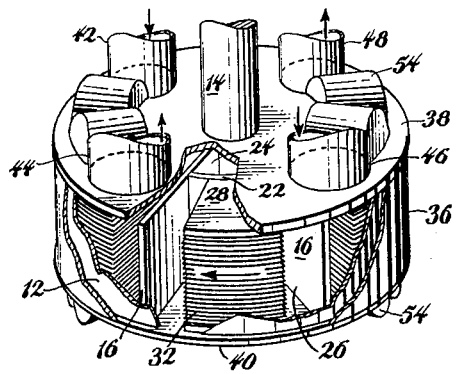
FIGURE 1 is a perspective view of a rotary regenerative heat exchange apparatus constructed in accordance with the invention.
Figure 2:
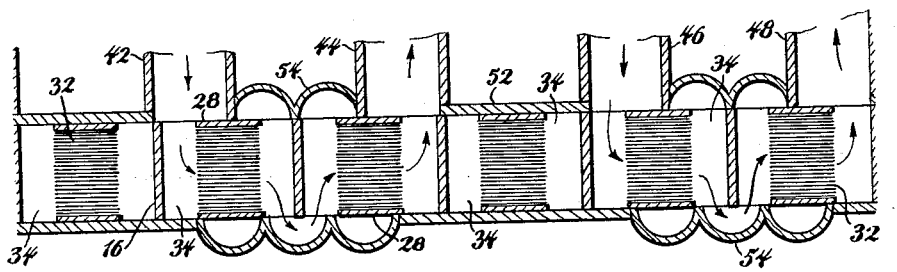
FIGURE 2 is an outstretched view of the apparatus of FIGURE 1 showing the fluid therethrough.
Figure 3:
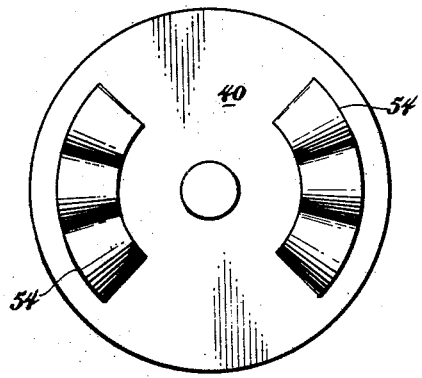
FIGURE 3 is a bottom plan view of the device shown in FIGURE 1.

Referring to FIGURE 1, the numeral 12 refers to a cylindrical rotor shell that is joined to a central rotor post 14 by imperforate radial partitions 16 that provide a series of sectorial compartments therebetween. An annular partition 22 intermediate the rotor shell 12 and rotor post 14 divides each sectorial compartment into an inner section 24 and an outer section 26. An arcuate plate 28 is inserted between and secured to the annular partition 22 and rotor shell 12 at both ends of the rotor to provide a series of open ended enclosures that are adapted to carry a mass of perforate heat absorbent material 32. The arcuate plates 28 extend circumferentially a distance substantially less than the arcuate extent of the sectorial compartments in which they are located to provide passageways 34 at opposite ends of the enclosures of heat absorbent material 32 through which fluid may pass before or after traversing the absorbent material.

A cylindrical housing 36 surrounds the rotor and is provided at opposite ends with end plates 38 and 40 that are apertured at circumferentially spaced locations to receive ducts 42, 44, 46 and 48 for the inlet and outlet flow of a heating fluid and a fluid to be heated. An imperforate portion 52 of the end plate 38 is provided intermediate the inlet and outlet ducts for the several fluids to provide a spacing between spaced ducts that is at least as great as the spacing intermediate radial partitions 16. This arrangement provides for the continuous isolation of a complete rotor compartment lying between the spaced ducts as the rotor is turned about its axis by a motive means (not illustrated).

To permit the serial flow of fluid through masses of heat absorbent material 32 and around the imperforate partitions 22 that lie intermediate inlet and outlet ducts for the respective fluids, bypass ducts 54 are secured to the outer surface of the spaced end plates 38 and 40. The by-pass ducts are sized to extend circumferentially a distance somewhat less than that of arcuate plate 28 in order that fluid flowing between inlet and outlet ducts for the respective fluids may not by-pass the enclosures of heat absorbent element 36 but will by-pass only the imperforate partitions 16 that lie therebetween. Bypass ducts 54 lying at one end of the housing are circumferentially offset from those at the other end by approximately one-half the space of each by-pass opening in order that fluid flowing between adjacent enclosures of element will not be retarded when the imperforate partitions 16 move into alignment with the wall that separates adjacent by-pass ducts 54. To further provide for a continuous fluid flow through the masses of heat absorbent element 36 the inlet and outlet ducts 42, 44, 46 and 48 are made substantially larger than plates 28. Thus during rotation of the rotor when a plate 28 is moved into momentary alignment with any of said ducts, fluid will continue to flow therethrough on its course to or from the element compartments within the rotor.

While this invention has been disclosed with reference to the embodiment illustrated in the drawing it is evident that various changes may be made without departing from the spirit of the invention.

For example, the number of sectorial compartments in the rotor may be varied and the inlet and outlet ducts may be located at opposite ends of the housing without altering the original concept of the invention. Thus it is intended that all matter contained in the above description or shown in the accompanying drawings shall be interpreted as illustrative and not in a limiting sense.

What I claim is:

1. Regenerative heat exchange apparatus for the transfer of heat between a heating fluid and a fluid to be heated comprising a housing; spaced ducts in said housing for the inlet and outlet flow of the heating fluid and the fluid to be heated; rotor means in said housing including a series of spaced open-ended frames forming enclosures disposed in an end-to-end arrangement and rotatably mounted to rotate between the spaced ducts; a perforate mass of heat exchange element carried in each enclosure of the rotor; imperforate diaphragm means carried by the rotor lying intermediate and spaced from adjacent ends of said enclosures to provide passageways permitting fluid flow to and from the heat exchange material carried thereby; and fluid by-pass ducts in said housing intermediate the inlet and outlet ducts for the heating fluid and the fluid to be heated arranged to permit said fluids to by-pass the imperforate diaphragms and flow between heat exchange material carried by said enclosures.

2. Rotary regenerative heat exchange apparatus for the transfer of heat between a heating fluid and a fluid to be heated including an outer housing, spaced ducts in said housing for the inlet and outlet flow of the heating fluid and the fluid to be heated, a rotor mounted in said housing and adapted to move continuously between spaced ducts, said rotor comprising a series of similar open-ended frames forming enclosures spaced apart in end-to-end relationship, a mass of heat exchange material carried in each enclosure of the rotor having a multiplicity of flow passageways that extend between open ends thereof, an imperforate diaphragm intermediate adjacent ends of said enclosures and spaced therefrom to permit the flow of fluid to and from the mass of heat exchange material, and fluid by-pass ducts in said housing arranged to permit the heating fluid and the fluid to be heated to by-pass the imperforate diaphragms and flow between enclosures in direct opposition to the moving rotor.

3. Rotary regenerative heat exchange apparatus having a fixed outer housing provided with spaced ducts for the flow therethrough of a heating fluid and a fluid to be heated; a rotor rotatably mounted in said housing to move continuously in opposition to the flow of said fluids, said rotor comprising a series of open-ended frames forming enclosures spaced apart in an end-to-end alignment; a mass of perforate heat absorbent material carried in each enclosure of the rotor; an imperforate diaphragm intermediate and spaced from the open ends of said compartments to provide flow passageways to the ends of said open-ended enclosure; and by-pass passageways on opposite sides of said housing arranged between the inlet and outlet ducts for each fluid to direct a continuous flow of the heating fluid and the fluid to be heated through aligned compartments of the rotor.

4. Rotary regenerative heat exchange apparatus including a cylindrical rotor shell joined to a central rotor post by imperforate radial partitions that provide a series of sectorial compartments therebetween; an annular partition intermediate the rotor shell and rotor post dividing said compartments into inner and outer sections; a sealing plate at axially opposite ends of each outer section extending between the rotor shell and annular portion and circumferentially spaced from the radial partition to provide a series of spaced open-ended frames forming enclosures; a mass of heat absorbent material carried by each of said enclosures; a cylindrical housing surrounding the rotor provided at opposite ends with end plates that confront the end edges of the partitions and the rotor shell; inlet and outlet ducts for a heating fluid and a fluid to be heated connected in spaced relation to said housing to direct the fluids through said enclosures in direct opposition to the rotating rotor; and by-pass ducts in said housing intermediate inlet and outlet ducts for the respective fluids adapted to permit said fluids to by-pass the imperforate partitions between moving compartments of heat absorbent material that lie between their respective inlet and outlet ducts.

5. Rotary regenerative heat exchange apparatus as defined in claim 4 wherein said by-pass ducts are positioned in both ends of said housing.

6. Rotary regenerative heat exchange apparatus as defined in claim 5 wherein said by-pass ducts at opposite ends of the housing are circumferentially offset one from another a distance substantially equal to one half the circumferential lengths of a single by-pass duct.

7. Rotary regenerative heat exchange apparatus as defined in claim 4 wherein the inlet and outlet ducts for the heating fluid and the fluid to be heated are larger than one of said sealing plates to preclude interruption of fluid flow to or from the rotor when said plate is in alignment with a duct.

8. Regeneratitve heat exchange apparatus for the transfer of heat between a heating fluid and a fluid to be heated comprising a housing, spaced ducts connected to said housing for the inlet and outlet flow of the heating fluid and the fluid to be heated, rotor means rotatably mounted in said housing including a series of open-ended frames forming enclosures in a spaced end to end arrangement, a perforate mass of heat exchange element carried in each enclosure, imperforate diaphragm means carried by the rotor intermediates the open ends of said enclosures arranged to provide passagewave adjacent the ends of each enclosure for the ingress and egress of fluid, and fluid by-pass ducts in said housing intermediate the inlet and outlet ducts for the heating fluid and intermediate the inlet and outlet ducts for the fluid to be heated arranged to connect passageways of adjoining enclosures to permit said fluids to by-pass the imperforate diaphragms and flow serially between adjacent frames of heat exchange element in direct opposition to the rotation of the rotor.

9. Regenerative heat exchange apparatus for the transfer of heat between a heating fluid and a fluid to be heated including a cylindrical housing, apertured end plates at opposite ends of said housing connected to spaced ducts for the inlet and outlet flow of the heating fluid and the fluid to be heated, rotor means rotatably mounted concentrically within said rotor housing comprising a cylindrical rotor shell, a central rotor post, imperforate diaphragm means extending from the rotor post to the rotor shell to form a series of sectorial compartments therebetween, a plate means at the axially displaced ends of said compartments arranged with their radial edges spaced from the diaphragm means to provide in each compartment a frame-like enclosure with laterally spaced inlet and outlet openings, a perforate mass of heat exchange material carried by each frame-like enclosure, and fluid by-pass ducts in said housing intermediate the inlet and outlet ducts for the heating fluid and intermediate the inlet and outlet ducts for the fluid to be heated arranged to connect openings of adjoining enclosures to permit said fluids to by-pass the imperforate diaphragms and flow serially between heat exchange element carried by adjacent enclosures.

10. Regenerative heat exchange apparatus as defined in claim 9 wherein the fluid by-pass ducts are located in the end plates at both ends of the housing.

11. Regenerative heat exchange apparatus as defined in claim 10 wherein the fluid by-pass ducts at one end of the housing are circumferentially offset from those at the opposite end of the housing to permit continuous fluid flow between adjacent enclosures.

References Cited in the file of this patent

UNITED STATES PATENTS

| | | |
|---|---|---|
| 2,480,277 | Yerrick | Aug. 30, 1949 |
| 2,995,344 | Hryniszak | Aug. 8, 1961 |